United States Patent

Lu et al.

[11] Patent Number: 6,081,400
[45] Date of Patent: Jun. 27, 2000

[54] POWER-OFF METHOD AND DEVICE FOR ELECTRONIC STORAGE APPARATUS

[75] Inventors: Li-Hsin Lu; Stephen R. Jackson, both of San Jose; David Drouin, Milpitas, all of Calif.

[73] Assignee: Castlewood Systems, Inc., Pleasanton, Calif.

[21] Appl. No.: 08/970,859

[22] Filed: Nov. 14, 1997

[51] Int. Cl.⁷ .......................... G11B 21/02; G11B 15/46
[52] U.S. Cl. ........................................ 360/75; 360/73.03
[58] Field of Search .................... 360/69, 73.03, 360/75, 78.04

[56] References Cited

U.S. PATENT DOCUMENTS

| | | | |
|---|---|---|---|
| 4,237,501 | 12/1980 | Barmache et al. | 360/75 |
| 4,686,592 | 8/1987 | Carroll et al. | 360/97 |
| 4,933,785 | 6/1990 | Morehouse et al. | 360/78.04 |
| 5,214,550 | 5/1993 | Chan | 360/97.01 |
| 5,262,918 | 11/1993 | Tannert | 360/133 |
| 5,291,355 | 3/1994 | Hatch et al. | 360/97.01 |
| 5,394,281 | 2/1995 | Kajitani | 360/105 |
| 5,455,723 | 10/1995 | Boutaghou et al. | 360/75 |
| 5,469,314 | 11/1995 | Morehouse et al. | 360/105 |
| 5,486,957 | 1/1996 | Albrecht | 360/75 |
| 5,590,006 | 12/1996 | Shafé | 360/105 |
| 5,615,064 | 3/1997 | Blank et al. | 360/75 |
| 5,729,399 | 3/1998 | Albrecht et al. | 360/75 |

*Primary Examiner*—W. Chris Kim
*Attorney, Agent, or Firm*—Townsend and Townsend and Crew LLP

[57] ABSTRACT

A technique for method for positioning a magneto resistive head located upon an actuator arm onto a loading ramp of a storage unit. The technique includes the steps of operating a removable magnetic disk at a first number of revolutions per second, the magnetic disk having an outer diameter, positioning the magneto resistive head adjacent to the removable magnetic disk, reading data from the removable magnetic disk, detecting a reset signal, producing a back electro-motive force in response to the reset signal, biasing the magneto resistive head towards the outer diameter of the removable magnetic disk in response to the reset signal and to the back electro-motive force, reducing a number of revolutions per second for the removable magnetic disk from the first number to a second number of revolutions per second, the first number greater than the second number; thereafter using an energy storage unit to bias the magneto resistive head onto the loading ramp, in response to the reset signal.

21 Claims, 12 Drawing Sheets

EPO CIRCUIT – FUNCTIONAL BLOCK DIAGRAM

EPO CIRCUIT – FUNCTIONAL BLOCK DIAGRAM

POWER-OFF METHOD AND DEVICE FOR ELECTRONIC STORAGE APPARATUS

BACKGROUND OF THE INVENTION

The present invention generally relates to removable storage devices for electronic information. More particular, the present invention provides a technique including an apparatus and methods for the movement and operation of a storage device including a magnetic head used to read and write data into a removable disk.

Consumer electronics including television sets, personal computers, and stereo or audio systems, have changed dramatically since their availability. Television was originally used as a stand alone unit in the early 1900's, but has now been integrated with audio equipment to provide video with high quality sound in stereo. For instance, a television set can have a high quality display coupled to an audio system with stereo or even "surround sound" or the like. This integration of television and audio equipment provides a user with a high quality video display for an action movie such as STARWARS™ with "life-like" sound from the high quality stereo or surround sound system. Accordingly, the clash between Luke Skywalker and Darth Vader can now be seen as well as heard in surround sound on your own home entertainment center. In the mid-1990's, computer-like functions became available on a conventional television set. Companies such as WebTV of California provide what is commonly termed as "Internet" access to a television set. The Internet is a world wide network of computers, which can now be accessed through a conventional television set at a user location. Numerous displays or "wet sites" exist on the Internet for viewing and even ordering goods and services at the convenience of home, where the act of indexing through websites is known as "surfing" the web. Accordingly, users of WebTV can surf the Internet or web using a home entertainment center.

As merely an example, FIG. 1 illustrates a conventional audio and video configuration, commonly termed a home entertainment system, which can have Internet access. FIG. 1 is generally a typical home entertainment system, which includes a video display 10 (e.g., television set), an audio output 20, an audio processor 30, a video display processor 40, and a plurality of audio or video data sources 50. Consumers have often been eager to store and play back pre-recorded audio (e.g., songs, music) or video using a home entertainment system. Most recently, consumers would like to also store and retrieve information, commonly termed computer data, downloaded from the Internet.

Music or audio have been traditionally recorded on many types of systems using different types of media to provide audio signals to home entertainment systems. For example, these audio systems include a reel to reel system 140, using magnetic recording tape, an eight track player 120, which uses eight track tapes, a phonograph 130, which uses LP vinyl records, and an audio cassette recorder 110, which relies upon audio cassettes. Optical storage media also have been recognized as providing convenient and high quality audio play-back of music, for example. Optical storage media exclusively for sound include a digital audio tape 90 and a compact disk 10. Unfortunately, these audio systems generally do not have enough memory or capacity to store both video and audio to store movies or the like. Tapes also have not generally been used to efficiently store and retrieve information from a personal computer since tapes are extremely slow and cumbersome.

Audio and video have been recorded together for movies using a video tape or video cassette recorder, which relies upon tapes stored on cassettes. Video cassettes can be found at the local Blockbuster™ store, which often have numerous different movies to be viewed and enjoyed by the user. Unfortunately, these tapes are often too slow and clumsy to store and easily retrieve computer information from a personal computer. Additional video and audio media include a laser disk 70 and a digital video disk 60, which also suffer from being read only, and cannot be easily used to record a video at the user site. Furthermore, standards for a digital video disk have not been established of the filing date of this patent application and do not seem to be readily establishable in the future.

From the above, it is desirable to have a storage media that can be used for all types of information such as audio, video, and digital data, which have features such as a high storage capacity, expandability, and quick access capabilities.

SUMMARY OF THE INVENTION

According to the present invention, a technique including methods and a device for providing a single type of media for electronic storage applications is provided. In an exemplary embodiment, the present invention provides a methods and apparatus for unloading of MR heads from the surface of removable media.

According to an embodiment, a method of using kinetic energy from a rotating disk after system power down of an electronic storage device and other sources of energy to perform housekeeping functions is provided. A technique for method for positioning a magneto resistive head located upon an actuator arm onto a loading ramp of a storage unit is disclosed. The technique includes the steps of operating a removable magnetic disk at a first number of revolutions per second, the magnetic disk having an outer diameter, positioning the magneto resistive head adjacent to the removable magnetic disk, reading data from the removable magnetic disk, and detecting a reset signal. The technique describes producing a back electro-motive force in response to the reset signal, biasing the magneto resistive head towards the outer diameter of the removable magnetic disk in response to the reset signal and to the back electro-motive force, and reducing a number of revolutions per second for the removable magnetic disk from the first number to a second number of revolutions per second, the first number greater than the second number. Thereafter, the technique includes using an energy storage unit to bias the magneto resistive head onto the loading ramp, in response to the reset signal.

Numerous benefits are achieved by way of the present invention. For instance, the present invention provides an efficient technique for using kinetic energy from a rotating disk of a storage device and other sources of energy during a power down step to perform housekeeping functions in the storage device. The present invention provides these functions without the use of complex drive motors or the like, which are often used in conventional techniques. The present invention further provides a more reliable method for providing such functions. Depending upon the embodiment, the present invention provides at least one of these if not all of these benefits and others, which are further described throughout the present specification.

Further understanding of the nature and advantages of the invention may be realized by reference to the remaining portions of the specification and drawings.

DESCRIPTION OF SPECIFIC EMBODIMENTS

System Overview

Figure 1:
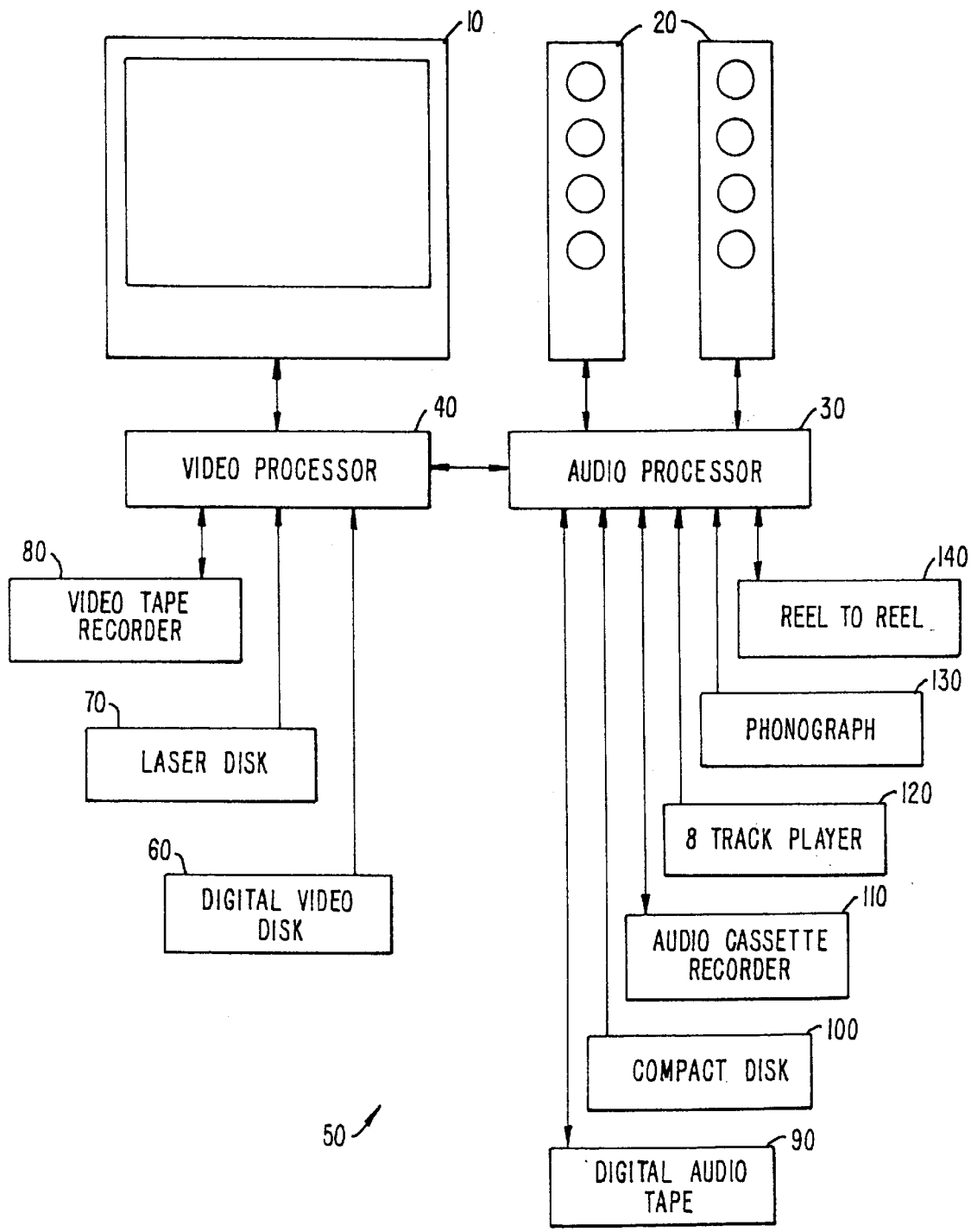
FIG. 1 illustrates a conventional audio and video configuration.
Figure 2:
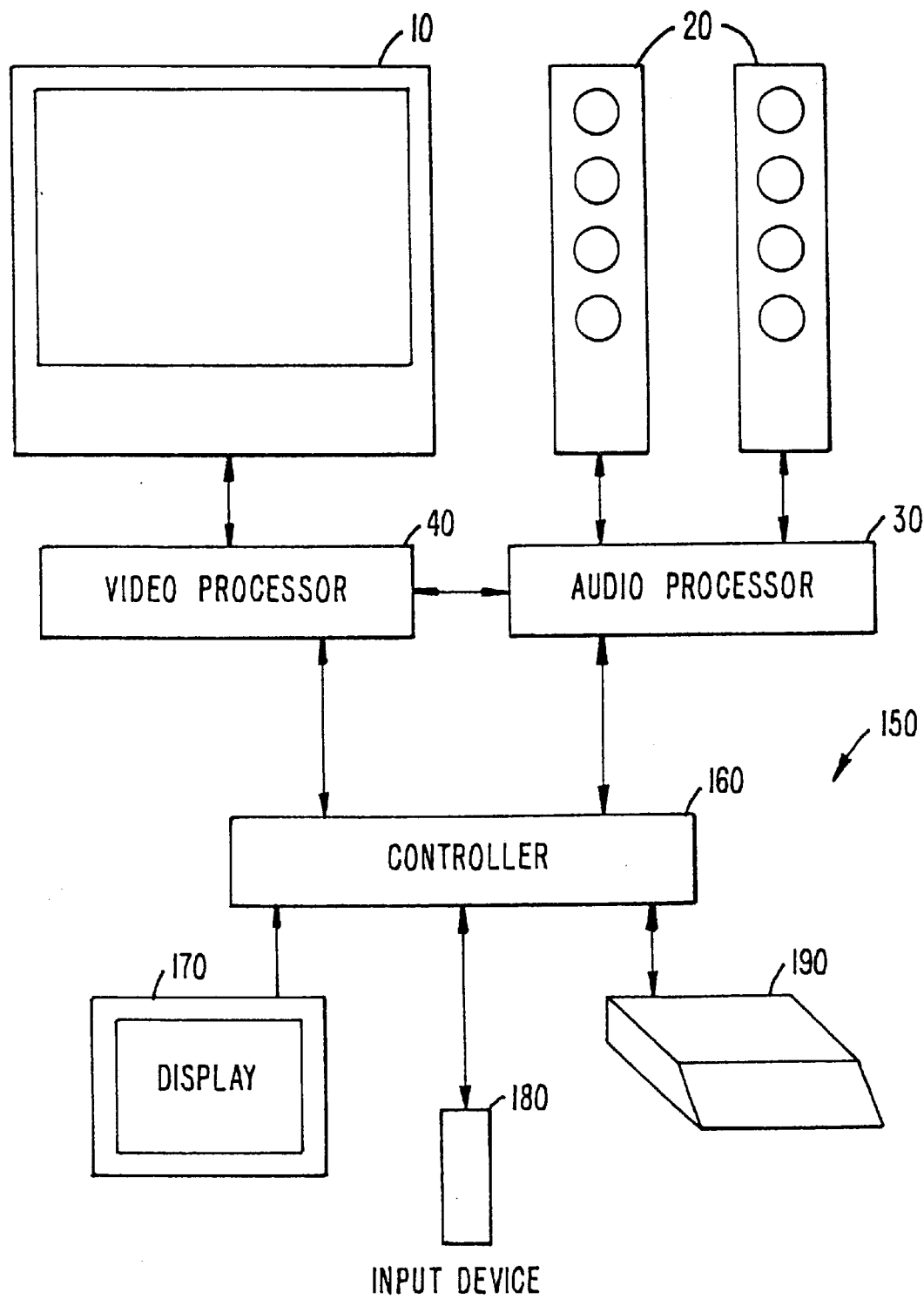
FIG. 2 illustrates a system according to an embodiment of the present invention.

FIG. 2 is a simplified block diagram of a system according to an embodiment of the present invention. This embodiment is merely an illustration and should not limit the scope of the claims herein. The system 150 includes the television display 10, which is capable of Internet access or the like, the audio output 20, a controller 160, a user input device 180, a novel storage unit 190 for storing and accessing data, and optionally a computer display 170. Output from system 150 is often audio and/or video data and/or data that is generally input into audio processor 30 and/or video processor 40.

Figure 5A:
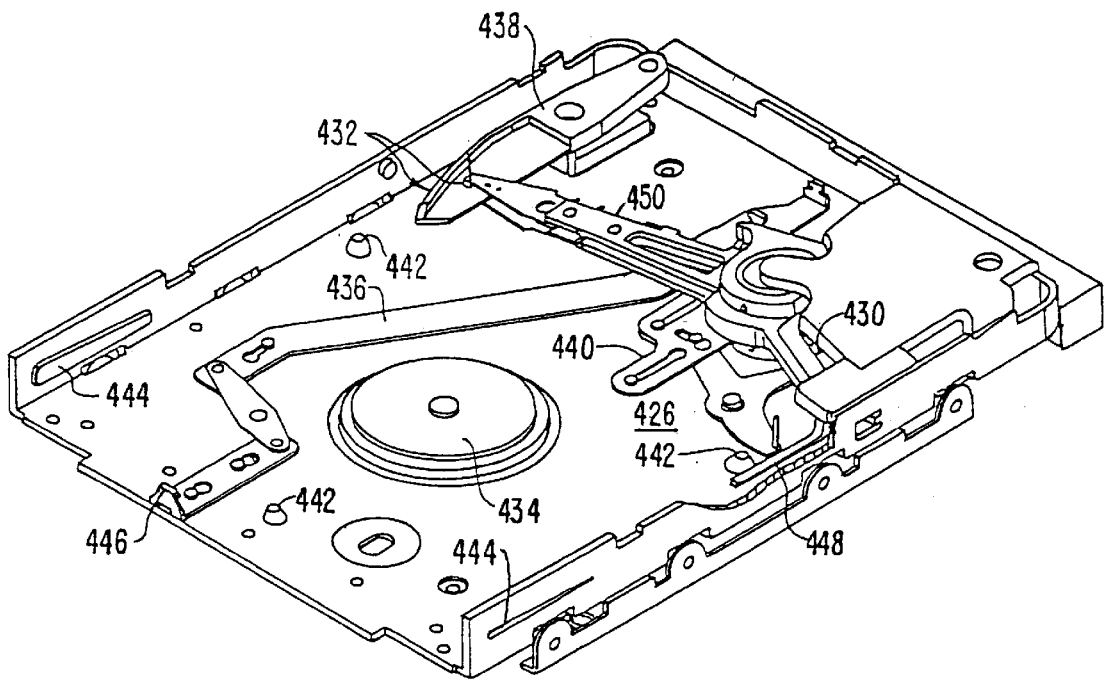
FIGS. 5A–5F illustrate simplified views and a storage unit for reading and/or writing from a removable media cartridge.
Figure 5B:
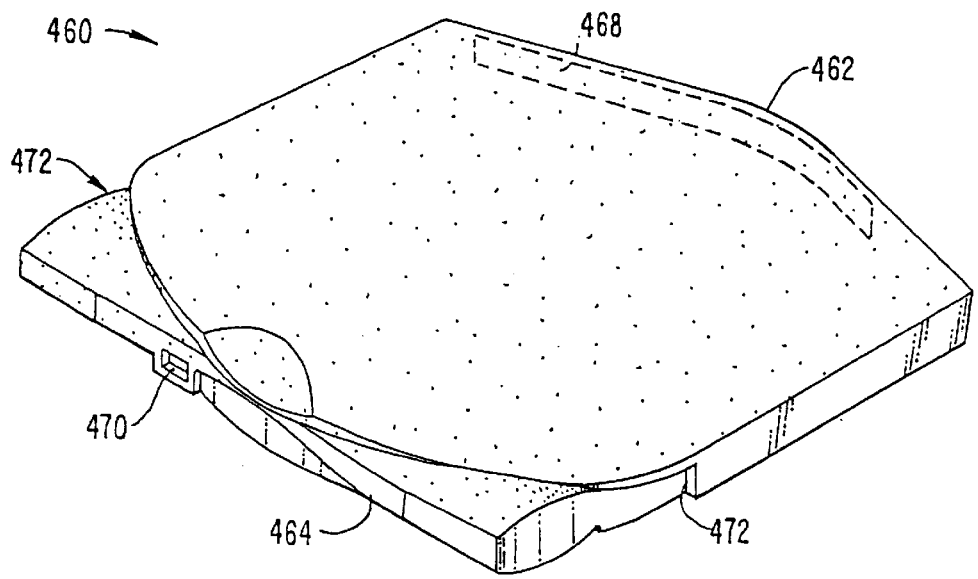
Figure 5C:
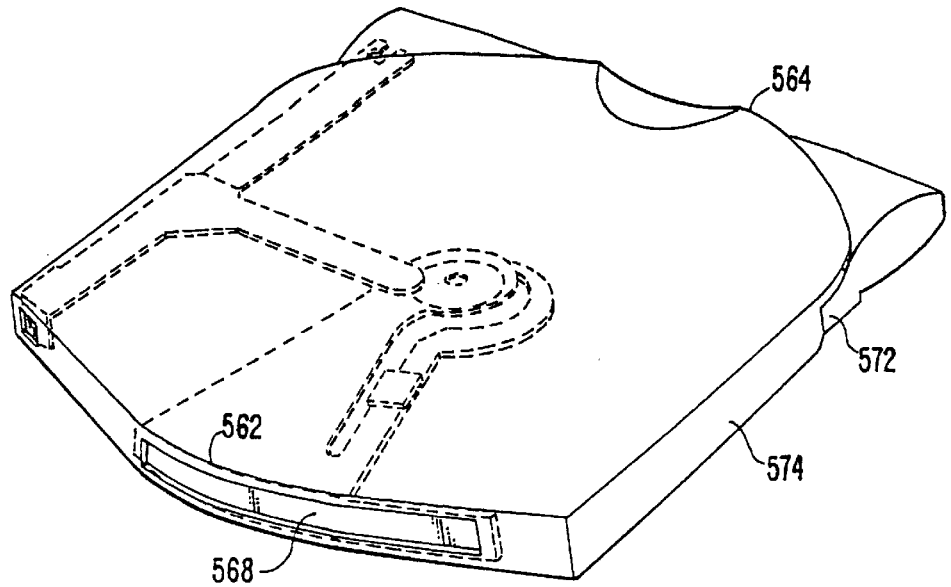

The storage unit includes a high capacity removable media cartridge, such as the one shown in FIGS. 5B & 5C, for example. The removable media cartridge can be used to record and playback information from a video, audio, or computer source. The cartridge is capable of storing at least 2 GB of data or information. The cartridge also has an efficient or fast access time of about 13 ms and less, which is quite useful in storing data for a computer. The cartridge is removable and storable. For example, the cartridge can store up to about 18 songs, which average about 4 minutes in length. Additionally, the cartridge can store at least 0.5 for MPEGII-2 for MPEGI full length movies, which each runs about 2 hours. Furthermore, the cartridge can be easily removed and stored to archive numerous songs, movies, or data from the Internet or the like. Accordingly, the high capacity removable media provides a single unit to store information from the video, audio, or computer. Further details of the storage unit are provided below.

Figure 3:
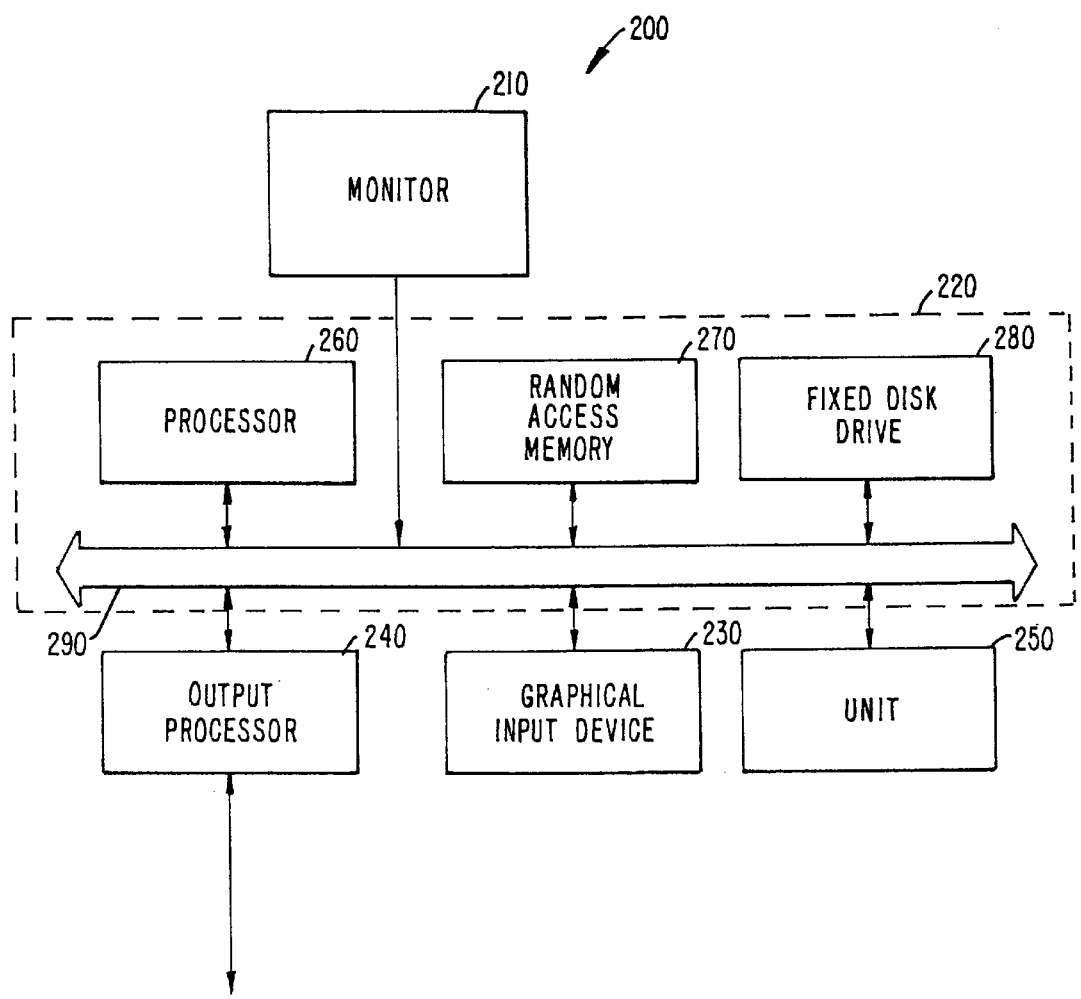
FIG. 3 includes a detailed block diagram of a system 200 according to an embodiment of the present invention.

In an alternative embodiment, FIG. 3 is a simplified block diagram of an audio/video/computer system 200. This diagram is merely an illustration and should not limit the scope of the claims herein. The system 200 includes a monitor 210, a controller 220, a user input device 230, an output processor 240, and a novel electronic storage unit 250 preferably for reading and writing from a removable media source, such as a cartridge. Controller 220 preferably includes familiar controller components such as a processor 260, and memory storage devices, such as a random access memory (RAM) 270, a fixed disk drive 280, and a system bus 290 interconnecting the above components.

User input device 230 may include a mouse, a keyboard, a joystick, a digitizing tablet, a wireless controller, or other graphical input devices, and the like. RAM 270 and fixed disk drive 280 are mere examples of tangible media for storage of computer programs and audio and/or video data, other types of tangible media include floppy disks, optical storage media such as CD-ROMs and bar codes, semiconductor memories such as flash memories, read-only-memories (ROMs), ASICs, battery-backed volatile memories, and the like. In a preferred embodiment, controller 220 includes a '586 class microprocessor running Windows98™ operating system from Microsoft Corporation of Redmond, Wash. Of course, other operating systems can also be used depending upon the application.

The systems above are merely examples of configurations, which can be used to embody the present invention. It will be readily apparent to one of ordinary skill in the art that many system types, configurations, and combinations of the above devices are suitable for use in light of the present disclosure. For example, in alternative embodiments of FIG. 2, for example, video display 10 is coupled to controller 220 thus a separate monitor 210 is not required. Further, user input device 230 also utilizes video display 10 for graphical feedback and selection of options. In yet other embodiments controller 220 is integrated directly into either audio processor 20 or video processor 30, thus separate output processor 240 is not needed. In another embodiment, controller 220 is integrated directly into video display 10. Of course, the types of system elements used depend highly upon the application.

Detailed Description

Figure 4A:
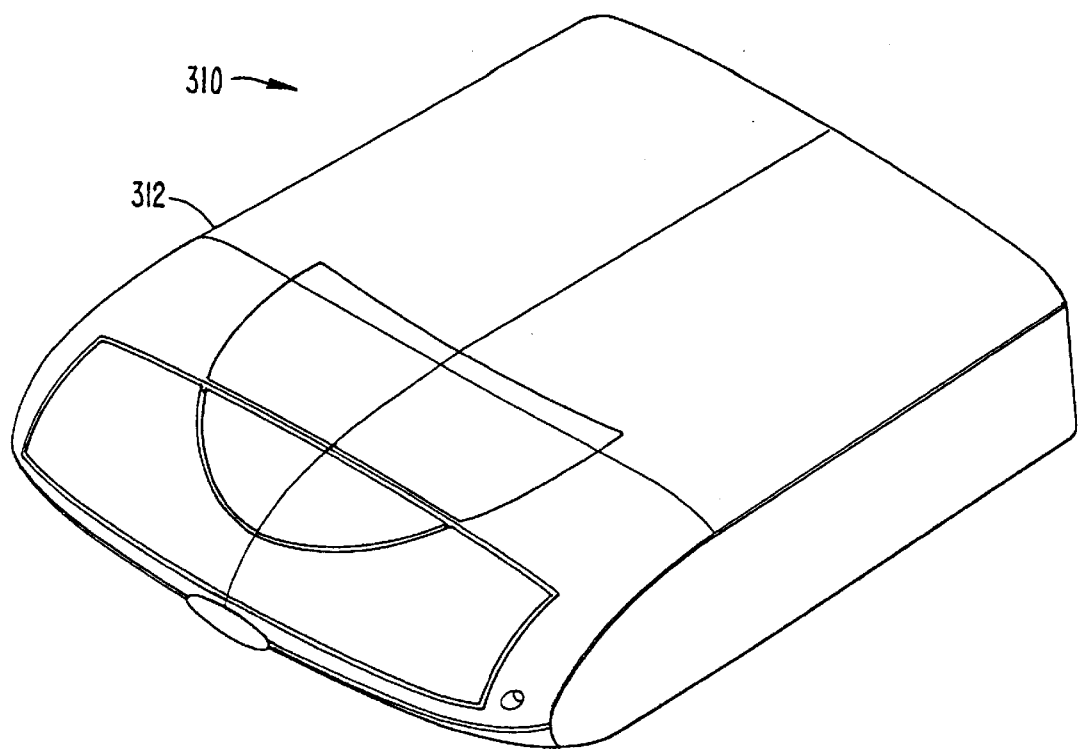
FIGS. 4A and 4B illustrate a storage unit according to an embodiment of the present invention.
Figure 4B:
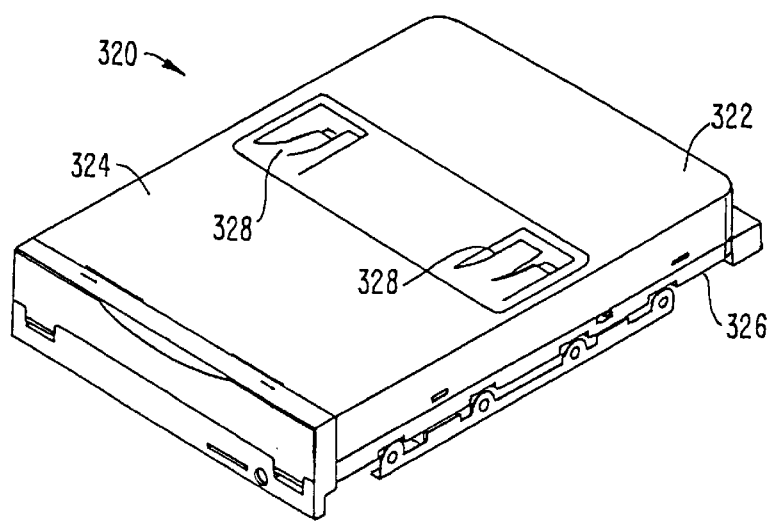

Referring now to FIGS. 4A and 4B, a storage unit according to the present invention can be an external disk drive 310 or internal disk drive 320 unit, which shares many of the same components. However, external drive 310 will include an enclosure 312 adapted for use outside a personal computer, television, or some other data manipulation or display device. Additionally, external drive 310 will include standard I/O connectors, parallel ports, and/or power plugs similar to those of known computer peripheral or video devices.

Internal drive 320 will typically be adapted for insertion into a standard bay of a computer. In some embodiments, internal drive 310 may instead be used within a bay in a television set such as HDTV, thereby providing an integral video system. Internal drive 320 may optionally be adapted for use with a bay having a form factor of 3 inches, 2.5 inches, 1.8 inches, 1 inch, or with any other generally recognized or proprietary bay. Regardless, internal drive 320 will typically have a housing 322 which includes a housing cover 324 and a base plate 326. As illustrated in FIG. 4B, housing 324 will typically include integral springs 328 to bias the cartridge downward within the receiver of housing 322. It should be understood that while external drive 310 may be very different in appearance than internal drive 320, the external drive will preferably make use of base plate 326, cover 324, and most or all mechanical, electromechanical, and electronic components of internal drive 320.

Many of the components of internal drive 320 are visible when cover 322 has been removed, as illustrated in FIG. 5A. In this exemplary embodiment, an actuator 450 having a voice coil motor 430 positions first and second heads 432 along opposed recording surfaces of the hard disk while the disk is spun by spindle drive motor 434. A release linkage 436 is mechanically coupled to voice coil motor 430, so that the voice coil motor effects release of the cartridge from housing 422 when heads 432 move to a release position on a head load ramp 438. Head load ramp 438 is preferably adjustable in height above base plate 426, to facilitate aligning the head load ramp with the rotating disk.

A head retract linkage 440 helps to ensure that heads 432 are retracted from the receptacle and onto head load ramp 438 when the cartridge is removed from housing 422. Head retract linkage 440 may also be used as an inner crash stop to mechanically limit travel of heads 432 toward the hub of the disk.

Base 426 preferably comprise a stainless steel sheet metal structure in which the shape of the base is primarily defined by stamping, the shape ideally being substantially fully defined by the stamping process. Bosses 442 are stamped into base 426 to engage and accurately position lower surfaces of the cartridge housing. To help ensure accurate centering of the cartridge onto spindle drive 434, rails 444 maintain the cartridge above the associated drive spindle until the cartridge is substantially aligned axially above the spindle drive, whereupon the cartridge descends under the influence of cover springs 428 and the downward force imparted by the user. This brings the hub of the disk down substantially normal to the disk into engagement with spindle drive 434. A latch 446 of release linkage 436 engages a detent of the cartridge to restrain the cartridge, and to maintain the orientation of the cartridge within housing 422.

A cartridge for use with internal drive 320 is illustrated in FIGS. 5B and 5C. Generally, cartridge 460 includes a front edge 462 and rear edge 464. A disk 666 (see FIG. 5F) is disposed within cartridge 460, and access to the disk is provided through a door 568. A detent 470 along rear edge 464 of cartridge 460 mates with latch 446 to restrain the cartridge within the receptacle of the drive, while rear side indentations 472 are sized to accommodate side rails 444 to allow cartridge 460 to drop vertically into the receptacle.

Figure 5D:
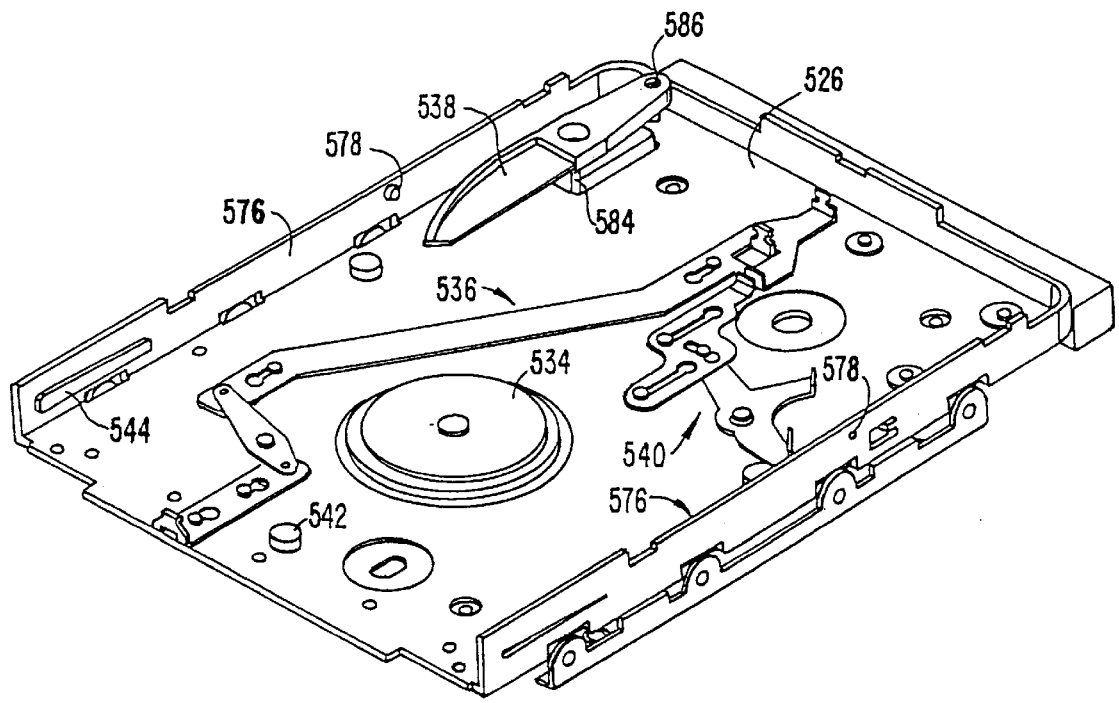
Figure 5E:
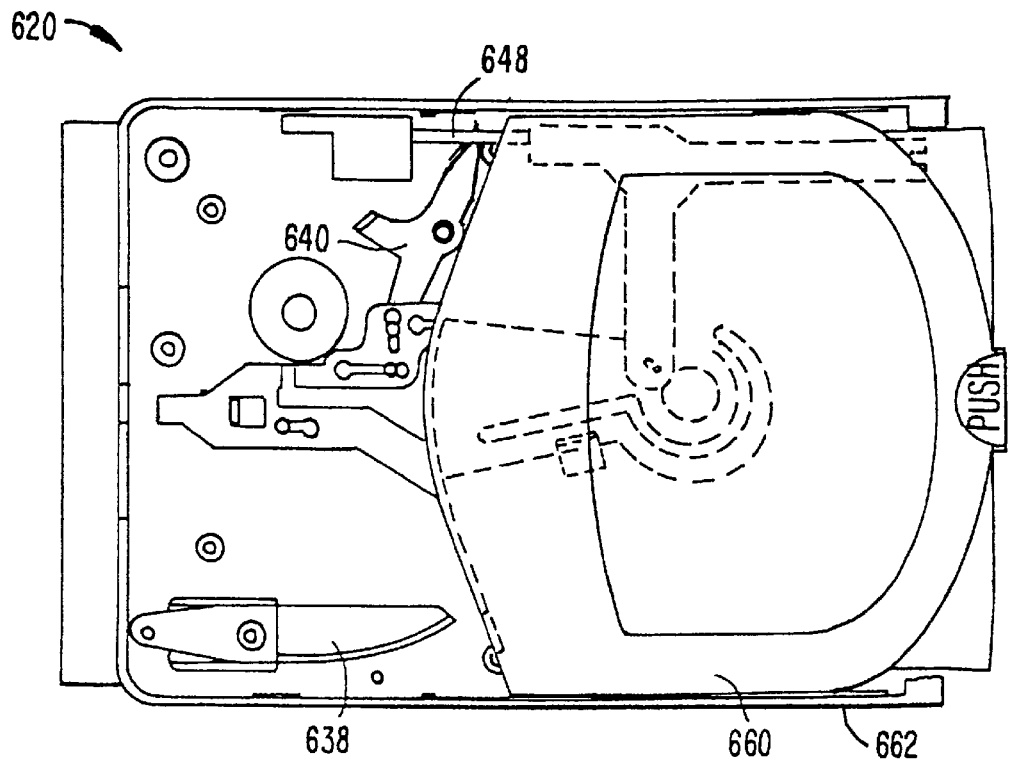

Side edges 574 of cartridge 460 are fittingly received between side walls 576 of base 526, as illustrated in FIG. 5D. This generally helps maintain the lateral position of cartridge 460 within base 426 throughout the insertion process. Stops 578 in sidewall 576 stop forward motion of the cartridge once the hub of disk 666 is aligned with spindle drive 534, at which point rails 444 are also aligned with rear indents 472. Hence, the cartridge drops roughly vertically from that position, which helps accurately mate the hub of the disk with the spindle drive.

Figure 5F:
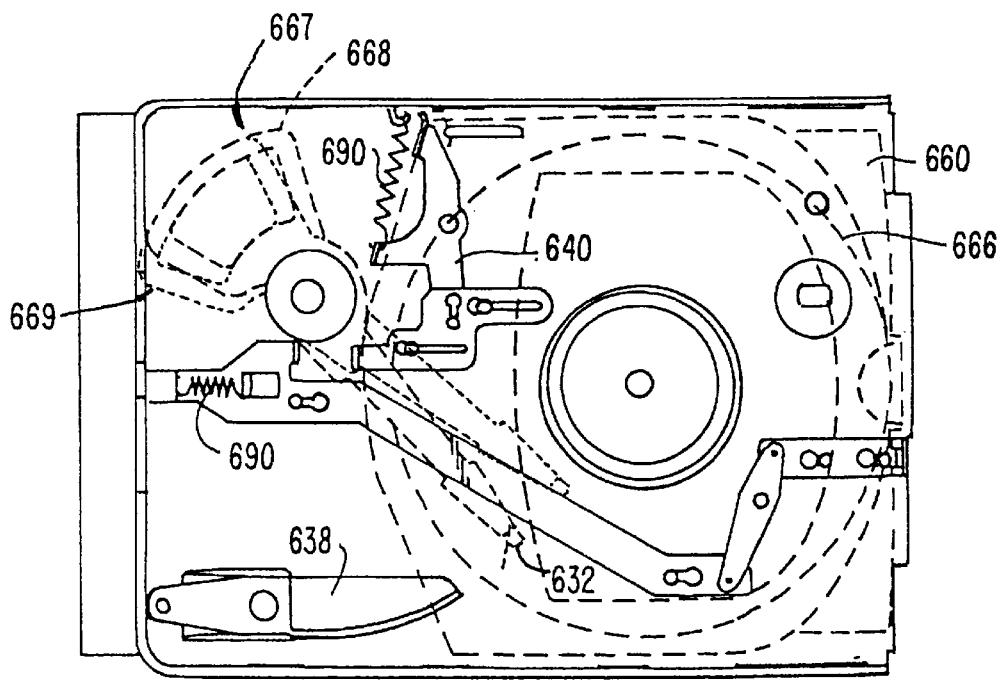

FIG. 5F also illustrates a typical first position 667 of VCM 668 and a typical second position 669 in response to different magnetic fluxes from a motor driver. As a result, read/write heads 632 are repositioned relative to disk 666 as shown.

Figure 6:
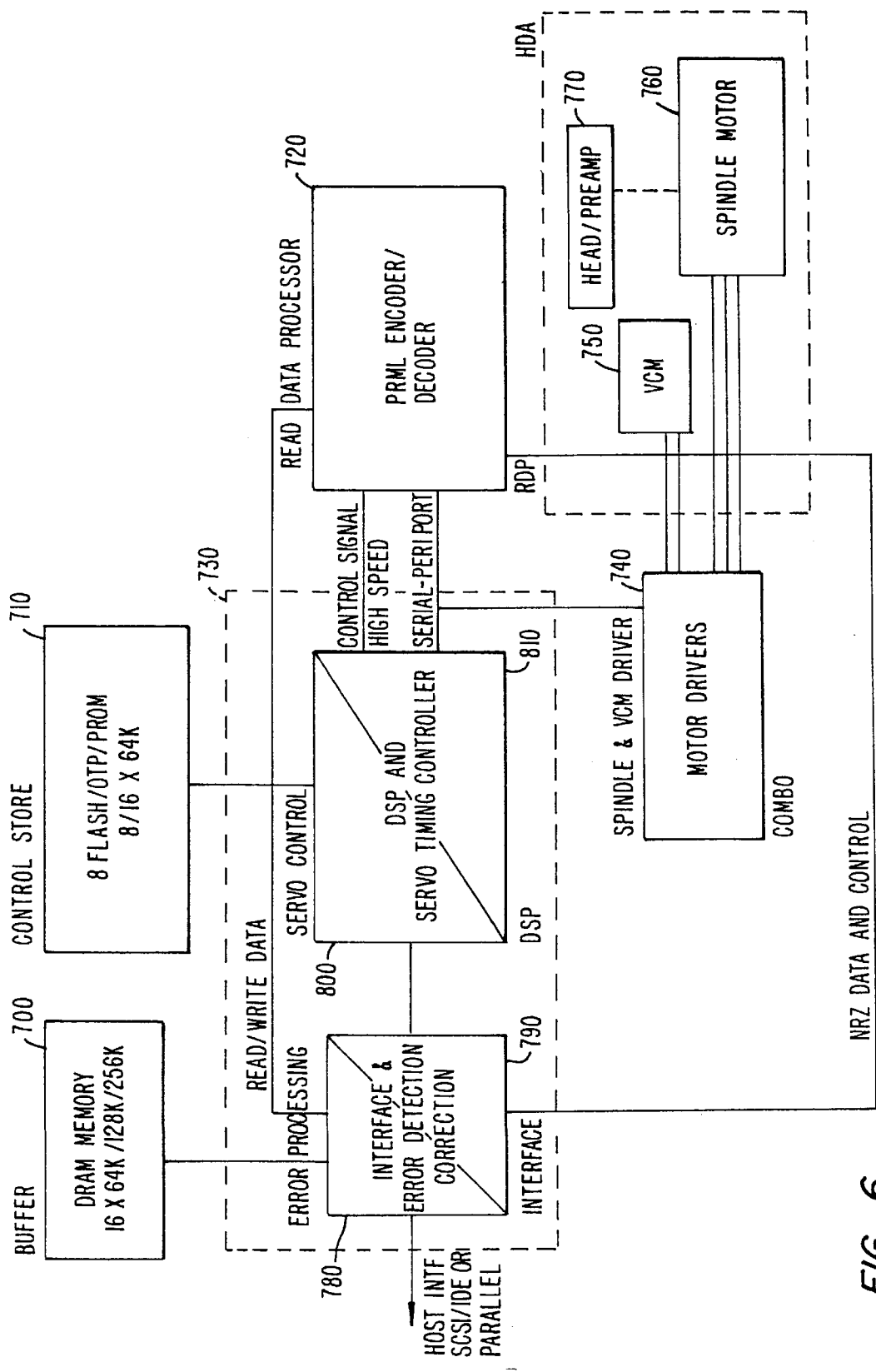
FIG. 6 illustrates a functional block diagram of an embodiment of the present invention.

FIG. 6 illustrates a simplified functional block diagram of an embodiment of the present invention. FIG. 6 includes a buffer 700, a control store 710, a read data processor 720, a controller 730, motor drivers 740, a voice coil motor 750, a spindle motor 760, and read/write heads 770. Controller 730 includes interface module 780, an error detection and correction module 790, a digital signal processor 800, and a servo timing controller 810. Voice coil motor 750 preferably corresponds to voice coil motor 430 in FIG. 5A, spindle motor 760 preferably corresponds to spindle drive motor 434 in FIG. 5A, and read/write heads 770 preferably correspond to read/write heads 432 on actuator arm 450 in FIG. 5A.

As illustrated in FIG. 6, buffer 700 typically comprises a conventional DRAM, having 16 bits×64K, 128K, or 256K, although other sized buffers are also envisioned. Buffer 700 is typically coupled to error detection and correction module 790. Buffer 700 preferably serves as a storage of data related to a specific removable media cartridge. For example, buffer 700 preferably stores data retrieved from a specific removable media cartridge (typically a magnetic disk), such as media composition and storage characteristics, the location of corrupted locations, the data sector eccentricity of the media, the non-uniformity of the media, the read and write head offset angles for different data sectors of the media and the like. Buffer 700 also preferably stores data necessary to compensate for the specific characteristics of each removable media cartridge, as described above. Buffer 700 typically is embodied as a 1 Meg DRAM from Sanyo, although other vendors' DRAMs may also be used. Other memory types such as SRAM and flash RAM are contemplated in alternative embodiments. Further, other sizes of memory are also contemplated.

Control store 710 typically comprises a readable memory such as a flash RAM, EEPROM, or other types of nonvolatile programmable memory. As illustrated, typically control store 710 comprises a 8 to 16 bit×64K memory array, preferably a flash RAM by Atmel. Control store 710 is coupled to DSP 800 and servo timing controller 810, and typically serves to store programs and other instructions for DSP 800 and servo timing controller 810. Preferably, control store 710 stores access information that enables retrial of the above information from the media and calibration data.

Read data processor 720 typically comprises a Partial Read/Maximum Likelihood (PRML) encoder/ decoder. PRML read channel technology is well known, and read data processor 720 is typically embodied as a 81M3010 chip from MARVELL company. Other read data processors, for example from Lucent Technologies are contemplated in alternative embodiments of the present invention. As illustrated, read data processor 720 is coupled to error detection and correction module 790 to provide ECC and data transport functionality.

Interface module 780 typically provides an interface to controller 220, for example. Interfaces include a small computer standard interface (SCSI), an IDE interface, parallel interface, PCI interface or any other known or custom interface. Interface module 780 is typically embodied as an AK-8381 chip from Adaptec, Inc. Interface module 780 is coupled to error detection and correction module 790 for transferring data to and from the host system.

Error detection and correction module 790 is typically embodied as a AIC-8381B chip from Adaptec, Incorporated. This module is coupled by a read/write data line to read data processor 720 for receiving read data and for ECC. This module is also coupled to read data processor 720 by a now return to zero (NRZ) data and control now return to zero line. Other vendor sources of such functionality are contemplated in alternative embodiments of the present invention.

DSP 800 typically provides high-level control of the other modules in FIG. 6. DSP 800 is typically embodied as a AIC-4421A DSP from Adaptec, Inc. As shown, DSP 800 is coupled to read data processor 720 to provide control signals for decoding signals read from a magnetic disk. Further, DSP 800 is coupled to servo timing controller 810 for controlling VCM 750 and spindle motor 760. Other digital signal processors can be used in alternative embodiments, such as DSPs from TI or Motorola.

Servo timing controller 810 is typically coupled by a serial peripheral port to read data processor 720 and to motor drivers 740. Servo timing controller 810 typically controls motor drivers 740 according to servo timing data read from the removable media. Servo timing controller 810 is typically embodied in a portion of DSP 800.

Motor driver 740 is typically embodied as a L6260L Chip from SGS-Thomson. Motor driver 740 provides signals to voice coil motor 750 and to spindle motor 760 in order to control the reading and writing of data to the removable media.

Spindle motor 760 is typically embodied as an 8 pole Motor from Sankyo Company. Spindle motor 760 typically is coupled to a center hub of the removable media as illustrated in FIG. 4 and rotates the removable media typically at rates from 4500 to 7200 revolutions per minute. Other manufacturers of spindle motor 760 and other rates of revolution are included in alternative embodiments.

VCM 750 is a conventionally formed voice coil motor. Typically VCM 750 includes a pair of parallel permanent magnets, providing a constant magnetic flux. VCM 750 also includes an actuator having a voice coil, and read/write heads. Read/ write heads are typically positioned near the end of the actuator arm, as illustrated in FIG. 5A. The voice coil is typically electrically coupled to motor driver 740. VCM 750 is positioned relative to the magnetic disk in response to the amount of magnetic flux flowing through the voice coil. FIG. 5F illustrates a typical first position 667 of VCM 668 and a typical second position 669 in response to different magnetic fluxes from motor driver 740. As a result, read/write heads 632 are repositioned relative to disk 666 as shown.

In a preferred embodiment of the present invention read/ write heads are separate heads that utilize magneto resistive technology. In particular, the MR read/write heads. Typically a preamplifier circuit is coupled to the read/write heads.

In the preferred embodiment of the present embodiment the removable media cartridge is comprises as a removable magnetic disk. When reading or writing data upon the magnetic disk the read/write heads on the end of the actuator arm "fly" above the surface of the magnetic disk. Specifically, because the magnetic disk rotates at a high rate of speed, typically 5400 rpm, a negative pressure pulls the read/write heads towards the magnetic disk, until the read/ write heads are typically 0.001 millimeters above the magnetic disk. At 2000 rpm, the negative pressure on the read/write heads drops to approximately half the force as at 5400 rpm.

Figure 7:
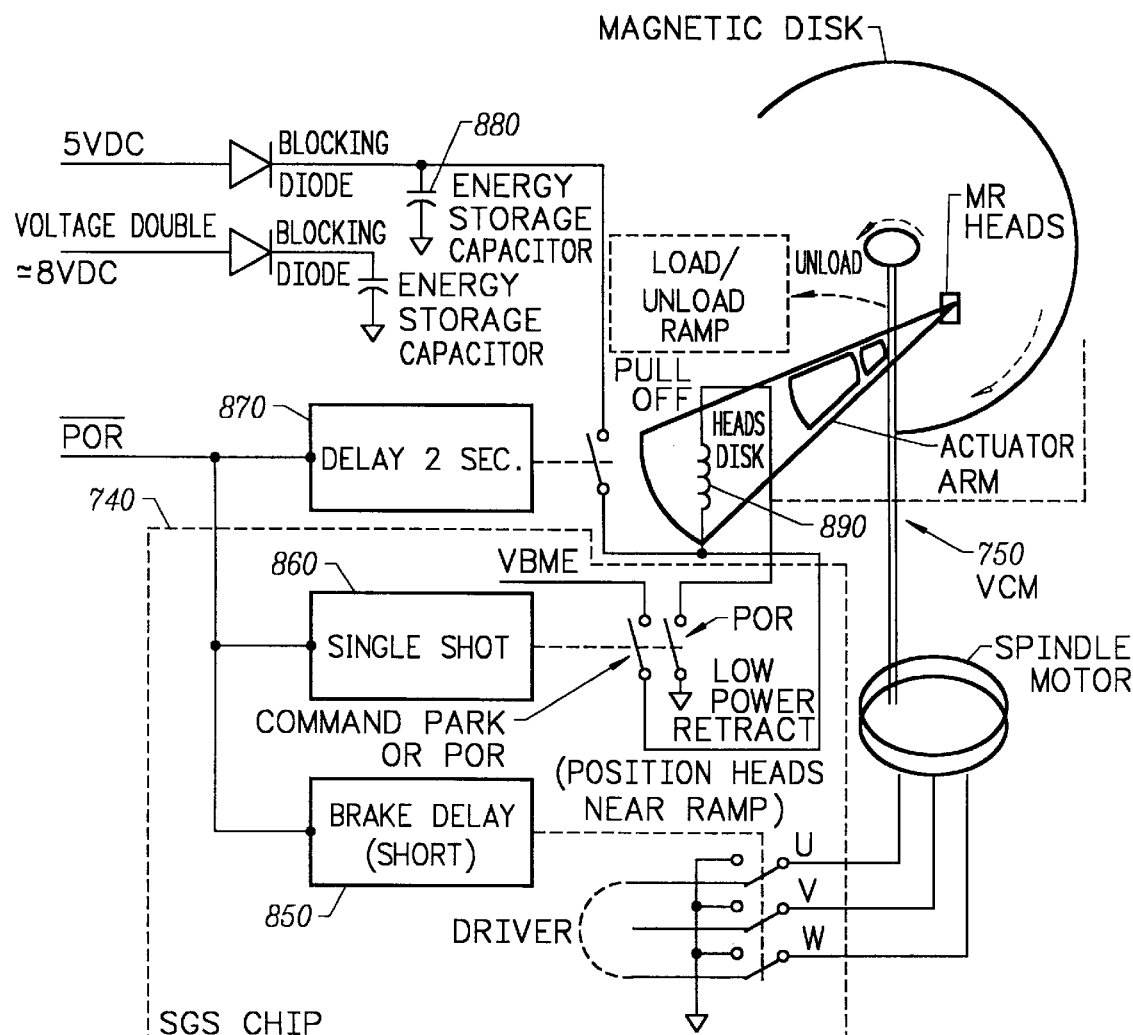
FIG. 7 illustrates a functional block diagram of a circuit for unloading read/write heads from the magnetic disk and onto a loading/unloading ramp.

FIG. 7 illustrates a functional block diagram of a circuit for unloading read/write heads from the magnetic disk and onto a loading/unloading ramp. FIG. 7 includes a more detailed block diagram of motor driver 740, above, including a dynamic braking/driver block 850, a retracting block 860, and a unloading block 870, each responsive to a power-on-reset (POR) signal. FIG. 7 also includes a energy storage capacitor 880. The solenoid 890 represents the voice coil described in conjunction with VCM 750, above.

In the embodiment in FIG. 7, dynamic braking/driver block 850 and retracting block 860 are embodied within the L6260L chip from SGS-Thomson.

In FIG. 7, when the power-on-reset POR signal is asserted, the spindle motor is decoupled from a drive voltage, and coupled to ground. The POR signal may be asserted in response to the user turning-off the unit, the user asserting a reset button on the unit, power glitches, or loose power connections.

In response to the POR signal, one terminal of solenoid 890 is grounded, and the other terminal is coupled to VBME through an internal field effect transistor (FET). VBME is derived from energy produced by the motor's back electromotive force (BEMF) that is synchronously rectified. VBME is typically ranges from 2 volts to 3 volts. The application of VBME to solenoid 890 typically has the effect of biasing the actuator towards the outer diameter of the magnetic disk. Further, in response to the POR signal the spindle motor dynamically brakes the magnetic disk after a delay period, as will be described below.

Next, in further response to the POR signal one terminal of the voice coil is grounded, and the other terminal is coupled to the output of energy storage capacitor 880 after a longer delay period as will be described below. Energy storage capacitor 880 is typically on the order of 100 microfarads or more. As illustrated, energy storage capacitor 880 is typically precharged from about 5 volts to about 9 volts. The coupling of storage capacitor 880 typically has the effect of unloading the actuator and the read/write heads off the magnetic disk and unloading the heads onto a load ramp. Other types of energy storage devices, besides a capacitor can be used in alternative embodiments.

Figure 8:
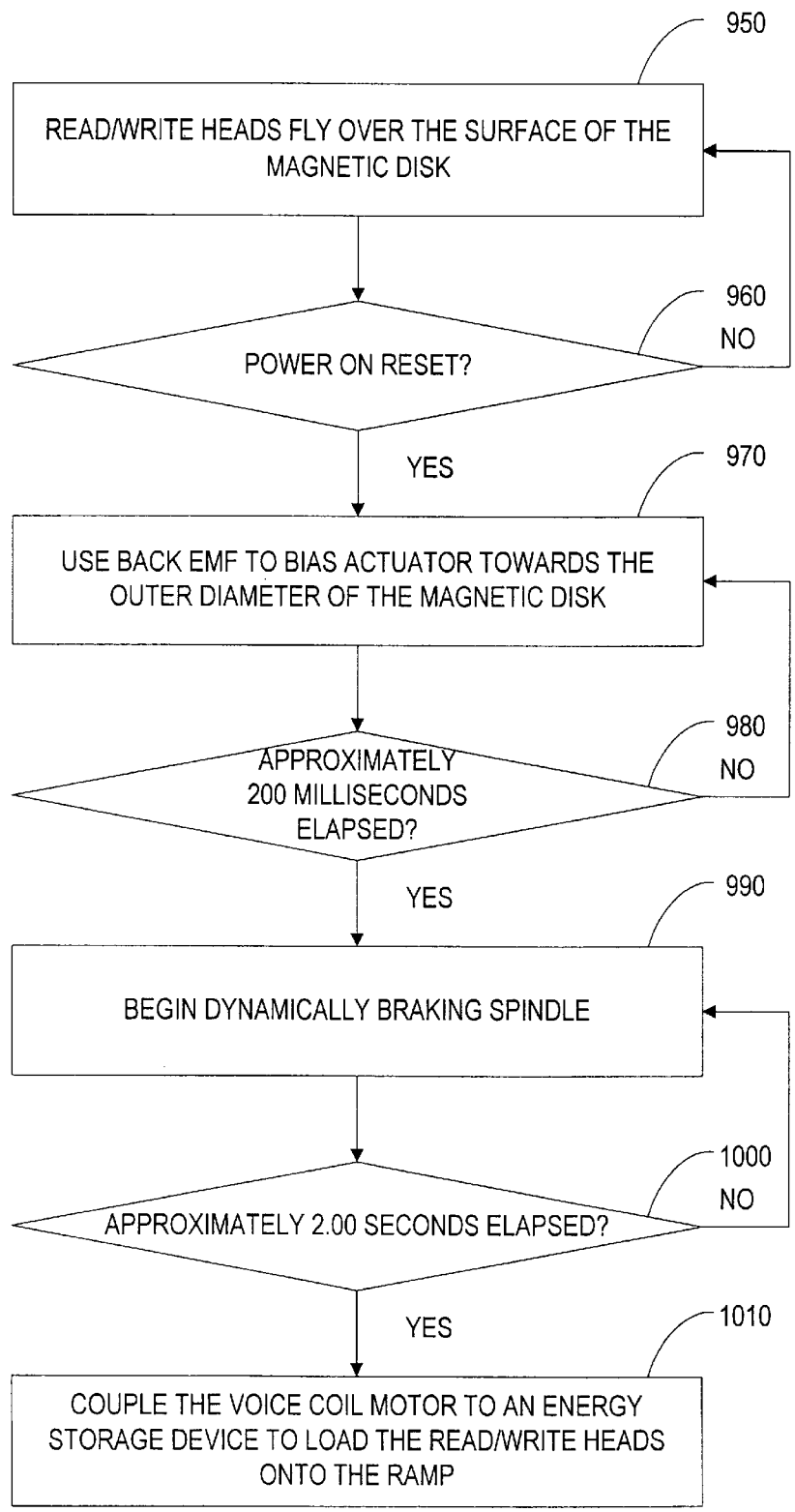
FIG. 8 illustrates a block diagram of a method for unloading heads according to an embodiment of the present invention.

FIG. 8 illustrates a block diagram of a method for unloading heads according to an embodiment of the present invention.

As described above, Initially, the read/write heads fly above the magnetic disk, step 950. Upon detection of a power on reset (POR), step 960, retracting block 860 couples VBME to solenoid 890, causing the actuator to be powered by back EMF to bias the actuator and the read/write heads towards the outer diameter of the magnetic disk, step 970. This step may also cause the read/write heads to unload onto a loading ramp. This step occurs for approximately 200 ms, as determined by an adjustable external time constant, step 980. This short delay may be set to other values in alternative embodiments of the present invention. After this "park duration", braking/driver block 850 begins to brake the magnetic disk step 970. After braking has begun, the spindle will have decreased in speed from approximately 5400 rpm to approximately 2600 rpm.

Next, after approximately two seconds after braking has begun, step 1000, as determined by another adjustable external time constant, an energy storing device, typically energy storage capacitor 880 is coupled to solenoid 890. Energy storage capacitor 880 then dumps stored energy into the VCM coil, causing the read/write heads to be unloaded from or lifted-off the disk and up onto the loading ramp, step 1010. If the heads were already unloaded in step 970, the present step pushes the heads further up the loading ramp. The delay of two seconds is typically determined by adjustable external electronic components. A time constant within two seconds is preferred. Preferably, the amount of force used to push the read/write heads up the loading ramp is approximately greater than 30 grams in practice.

Figure 9:
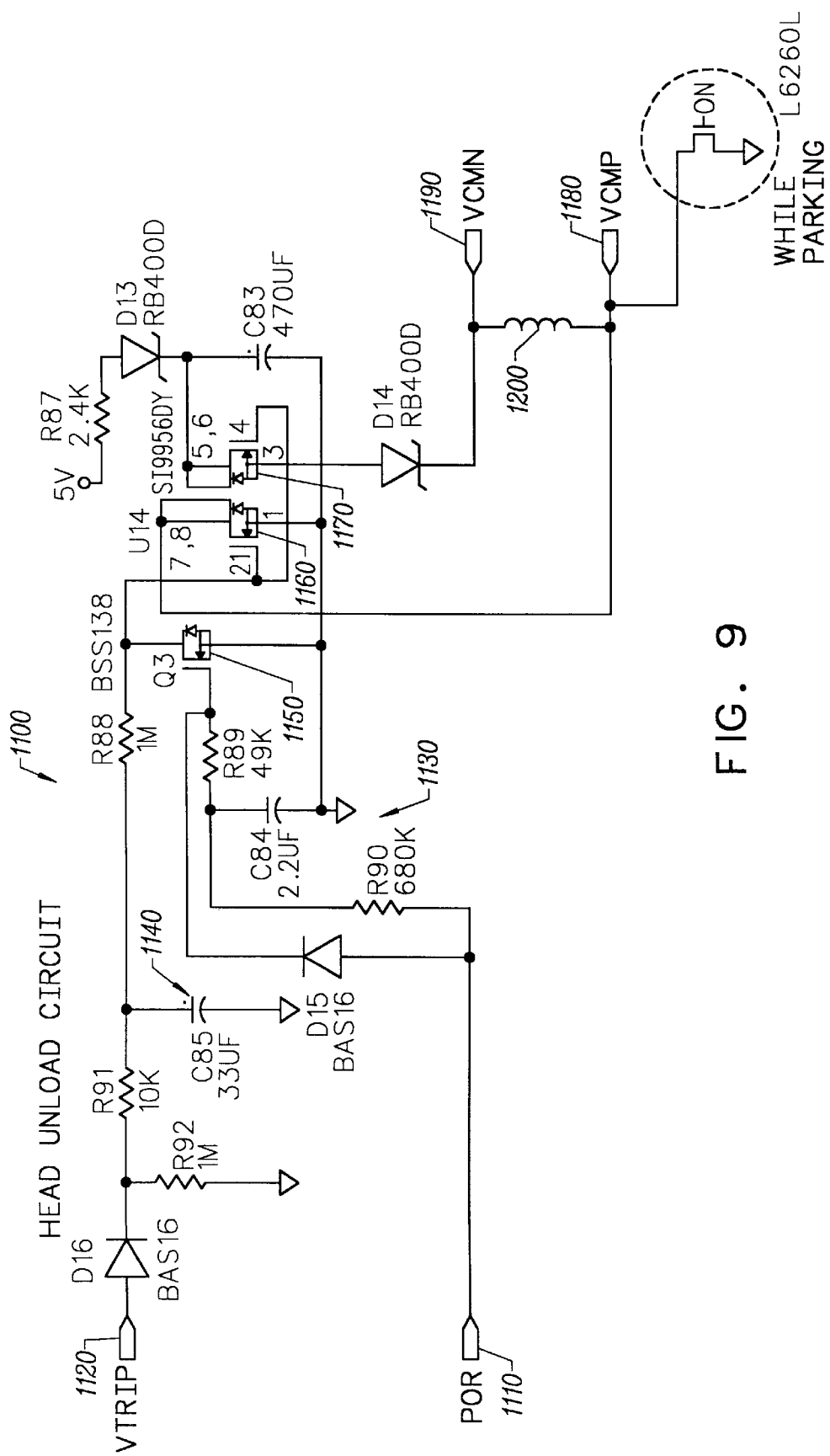
FIG. 9 illustrates a more detailed circuit in a preferred embodiment of the present invention.

FIG. 9 illustrates a more detailed circuit in a preferred embodiment of the present invention. Circuit 1100, includes a Power Off Reset signal (POR) 1110, a voltage source VTRIP 1120, a delay circuit 1130, a storage capacitor 1140, FETs 1150, 1160, and 1170. Circuit 1100 also includes a voice coil motor positive terminal (VCMP) 1180, and a voice coil motor negative terminal (VCMN) 1190. Voice coil motor is represented by solenoid 1200.

In operation, VTRIP 1120 is held to a constant voltage, such as 5 volts, or 9 volts. As a result, storage capacitor 1140 is also held to this constant voltage. When POR 1110 goes low, a power-off condition delay circuit 1130 delays the deactivation of FET 1150 for approximately 2 seconds. In response to FET 1150 being deactivated, FETs 1160 and 1170 respectively couple storage capacitor 1140 to VCMP 1180, and ground to VCMN 1190. The energy stored in storage capacitor 1140 is therefore applied to solenoid 1200 for read/write unloading purposes.

Figure 10:
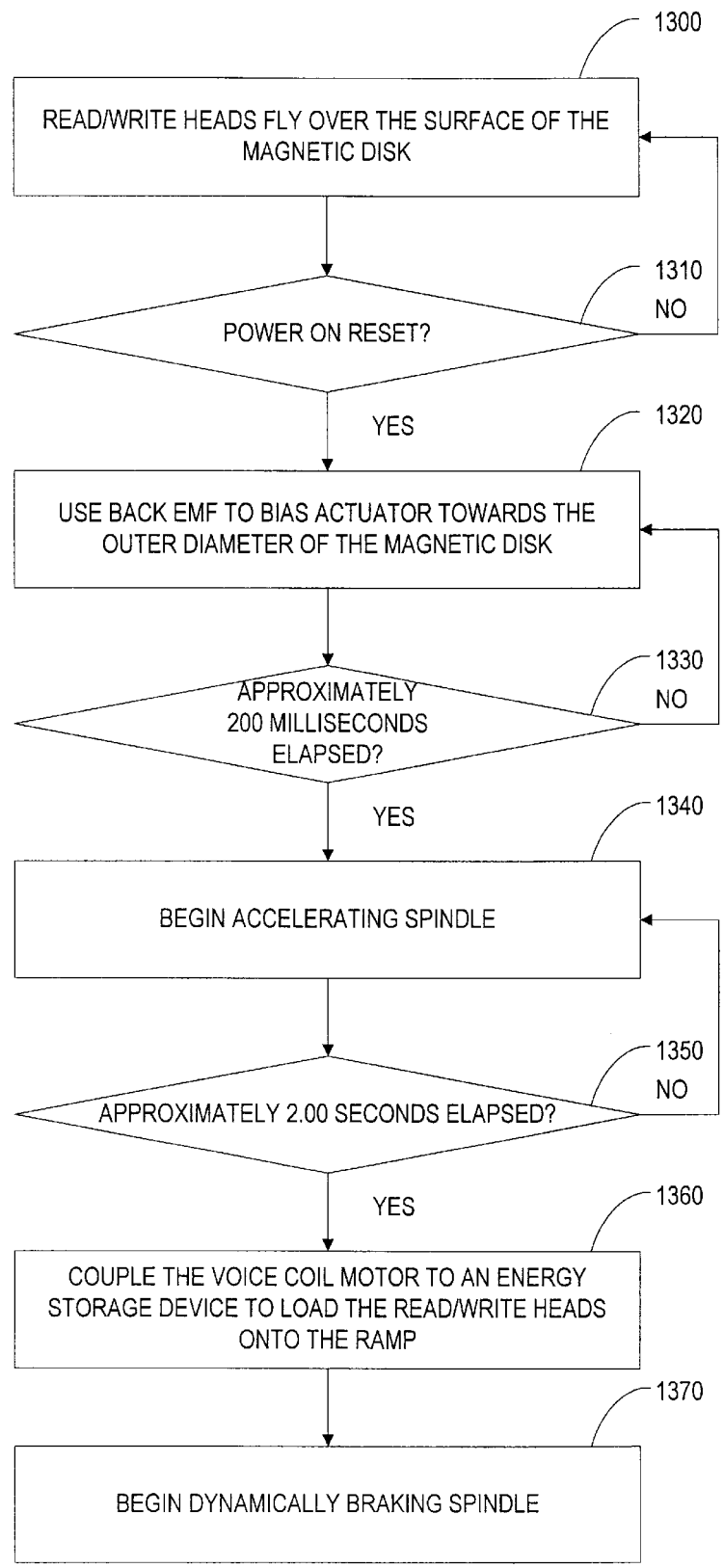
FIG. 10 illustrates a block diagram of a method for unloading heads according to another embodiment of the present invention.

FIG. 10 illustrates a block diagram of a method for unloading heads according to another embodiment of the present invention.

Initially, the read/write heads fly above the magnetic disk, step 1300. Upon detection of a power on reset (POR), step 1310, retracting block 860 couples VBME to solenoid 890, causing the actuator and the read/write heads to be biased towards the edge of the magnetic disk, step 1320. Preferably heads are biased towards the outer diameter, however, in alternative embodiments, the heads may be biased towards the inner diameter. This initial biasing occurs for approximately 200 ms, again as determined by user selectable components, step 1330.

After this initial biasing, braking/driver block 850 begins to accelerate the magnetic disk, step 1340. Preferably, in normal operation, the magnetic disk rotates at approximately 5400 rpm. When this step is performed, the magnetic disk is preferably accelerated to greater than approximately 6000 rpm.

After approximately 2 seconds after the magnetic disk is accelerated, this magnetic disk preferably rotates above approximately 6000 rpm, step 1350. Next, the energy storage device, typically energy storage capacitor 880 is then coupled to solenoid 890 so as to dump the stored energy into the VCM, step 1360. The result of this is that the heads are biased onto the loading ramp as was previously described. Preferably, the magnetic disk is then dynamically braked, step 1370.

This latter embodiment is preferred based upon experimental data that illustrates the height of the read/write heads above the magnetic disk are more repeatable at a higher number of rpms (approximately 6000 rpm) than at a lower number of rpms (approximately 2600 rpm). As a consequence, POR unloading in the latter embodiment produces more predictable unloading conditional results.

In a preferred embodiment, the initial biasing may or may not bias the heads onto the ramp. The final biasing biases the heads onto the ramp, if not already done so, or further biases the heads onto the ramp.

Conclusion

In the foregoing specification, the invention has been described with reference to specific exemplary embodiments thereof. Many changes or modifications are readily envisioned. For example, it is envisioned that the initial biasing occur towards the inner diameter of the disk, and the final biasing occur towards the outer diameter of the disk. Further, different elapsed times than the above embodiments are clearly contemplated.

The presently claimed inventions may also be applied to other areas of technology such as mass storage systems for storage of video data, audio data, textual data, program data, or any computer readable data in any reproducible format.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system including a storage unit having a magneto resistive head positioned on an actuator arm and a loading ramp, the storage unit for loading the magneto resistive head from a position adjacent to a surface of a magnetic disk to a position adjacent to the loading ramp, the storage unit comprising:

a reset generator for asserting a reset signal;

a switching circuit coupled to the reset generator for providing a limited reset signal for a first duration, and for providing a delayed reset signal for a second duration, in response to the reset signal;

a spindle motor coupled to the magnetic disk and to the switching circuit for rotating the magnetic disk a first number of revolutions per minute, for creating an electro-motive force in response to the limited reset signal, and for rotating the magnetic disk a second number of revolutions per minute in response to the delayed reset signal;

a first biasing circuit coupled to the actuator arm and to the spindle motor for biasing the magneto resistive head towards an edge of the magnetic disk in response to the electro-motive force;

an energy storage device coupled to the reset generator for storing a biasing charge, and for outputting the biasing charge in response to the reset signal;

a delay circuit coupled to the energy storage device and to the reset generator for delaying output of the biasing charge to form a delayed biasing charge in response to the reset signal; and a second biasing circuit coupled to the actuator arm and to the delay circuit for biasing the magneto resistive head towards the loading ramp in response to the delayed biasing charge.

2. The system of claim 1, wherein the spindle motor brakes the magnetic disk in response to the delayed reset signal.

3. The system of claim 2, wherein the first number of revolutions per minute is greater than the second number of revolutions per minute.

4. The system of claim 1, wherein the spindle motor accelerates the magnetic disk in response to the delayed reset signal.

5. The system of claim 4, wherein the second number of revolutions per minute is greater than the first number of revolutions per minute.

6. The system of claim 1, wherein the second number of revolutions per minute is less than approximately 2600 revolutions per minute.

7. The system of claim 1, wherein the second number of revolutions per minute is less than approximately 2000 revolutions per minute.

8. The system of claim 1, wherein the second number of revolutions per minute is greater than approximately 6000 revolutions per minute.

9. The system of claim 1 wherein the edge of the magnetic disk is the outer diameter of the magnetic disk.

10. The system of claim 1, wherein the second biasing circuit is also for biasing the magneto resistive head onto the loading ramp in response to the delayed biasing charge.

11. A method for operating a storage unit including a magneto resistive head adjacent to a removable magnetic disk comprises:

generating a reset signal in response to a power-off condition;

generating a limited reset signal for a first duration in response to the reset signal;

generating a delayed reset signal for a second duration in response to the reset signal;

rotating, using a spindle motor coupled to the magnetic disk, the magnetic disk a first number or revolutions per minute;

creating, using the spindle motor, an electro-motive force in response to the limited reset signal, rotating, using the spindle motor, the magnetic disk a second number of revolutions per minute in response to the delayed reset signal;

biasing the magneto resistive head towards an edge of the magnetic disk in response to the electro-motive force;

providing a biasing charge from an energy storage device in response to the reset signal;

delaying output of the biasing charge to form a delayed biasing in response to the reset signal; and biasing the magneto resistive head towards the loading ramp in response to the delayed biasing charge.

12. The method of claim 11, further comprising braking the magnetic disk in response to the delayed reset signal.

13. The method of claim 12, wherein the first number of revolutions per minute is greater than the second number of revolutions per minute.

14. The method of claim 11, further comprising accelerating the magnetic disk in response to the delayed reset signal.

15. The method of claim 14, wherein the second number of revolutions per minute is greater than the first number of revolutions per minute.

16. The method of claim 11, wherein the second number of revolutions per minute is less than approximately 2600 revolutions per minute.

17. The method of claim 11, wherein the second number of revolutions per minute is less than approximately 2000 revolutions per minute.

18. The method of claim 11, wherein the second number of revolutions per minute is greater than approximately 6000 revolutions per minute.

19. The method of claim 11 wherein the edge of the magnetic disk is the outer diameter of the magnetic disk.

20. The method of claim 11, further comprising biasing the magneto resistive head onto the loading ramp in response to the delayed biasing charge.

21. The method of claim 11, wherein the power-off condition comprises loss of power to the storage unit.

* * * * *